455-613 AU 233 EX

FIP8106 XR 3,794,841

United States Patent [19]

Cosentino et al.

[11] 3,794,841

[45] Feb. 26, 1974

[54] LIGHT COUPLING DATA TRANSFER SYSTEM

[76] Inventors: Louis Ciro Cosentino, 24350 Holly Ln. North, Wayzata, Minn. 55391; Peter Richard Bove, 23 Sheffield Ave., Spotswood, N.J. 08884

[22] Filed: July 25, 1972

[21] Appl. No.: 274,956

[52] U.S. Cl. .............................. 250/199, 128/2.1 A

[51] Int. Cl. .............................................. H04b 9/00

[58] Field of Search ....... 250/199; 128/2.1 A, 2.1 R; 331/114, 135, 179; 330/4.5; 332/24; 325/38 R, 142; 340/206

[56] References Cited

UNITED STATES PATENTS

| | | | |
|---|---|---|---|
| 3,488,586 | 1/1970 | Watrous et al. | 250/199 |
| 3,528,011 | 9/1970 | Anderson | 250/199 |
| 3,656,066 | 4/1972 | Reynal | 331/135 |
| 3,667,067 | 5/1972 | Levell | 331/135 |

*Primary Examiner*—Albert J. Mayer

*Attorney, Agent, or Firm*—Samuel L. Welt; Bernard S. Leon

[57] ABSTRACT

A system especially for use in accurately transmitting patient derived data comprising a light coupling unit employed for patient isolation purposes, a modulating unit for generating a constant amplitude switching waveform of a frequency higher than the patient derived data having zero crossings which are modulated thereby to drive the light coupling unit between an on and off state, and a demodulating unit connected from the light coupling unit for demodulating the zero crossing information derived to essentially recover the patient derived data.

4 Claims, 3 Drawing Figures

LIGHT COUPLING DATA TRANSFER SYSTEM

BACKGROUND OF THE INVENTION

The present invention relates to a light coupled isolation system for data transfer. In the field of physiological monitoring, it is becoming increasingly desirable to transmit electrical signal outputs from a bedside monitor to a remote computer, data storage and/or observation station. This, of course, presents a problem of patient safety whereby it is important to assure that the inherent safety standards normally built into the bedside equipment are not compromised by having under all conditions, an isolator placed between the monitor and the remote station.

At the same time due to the nature of the data, accuracy in transmittal is of extreme importance and this should be assured over the life of the isolator coupling. In most monitoring systems of this type multiple data transmission is employed, which means cost is an additional essential factor in the choice of an isolator system.

SUMMARY

The purpose of the present invention is to provide a low cost light coupling isolator system which is especially suitable for reliably transmitting patient derived data. This is accomplished by a system in which a light coupling isolator is sharply driven on and off to provide stable zero crossing information by causing the patient derived processed data to modulate the zero crossing of a high frequency constant amplitude switching waveform. The modulated signal is coupled through an on-off optical isolator to a demodulator, having a separate isolated power supply, which recovers the original signal information.

PREFERRED EMBODIMENT OF THE INVENTION

Figure 1:
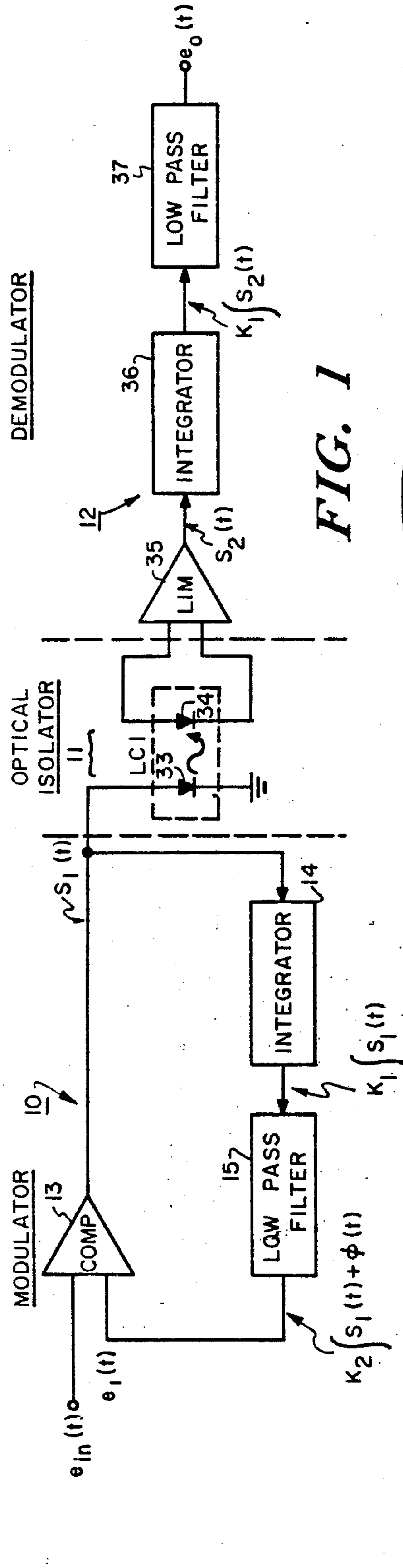
FIG. 1 is a block diagram showing the principle of a system employing features of the invention.
Figure 2:
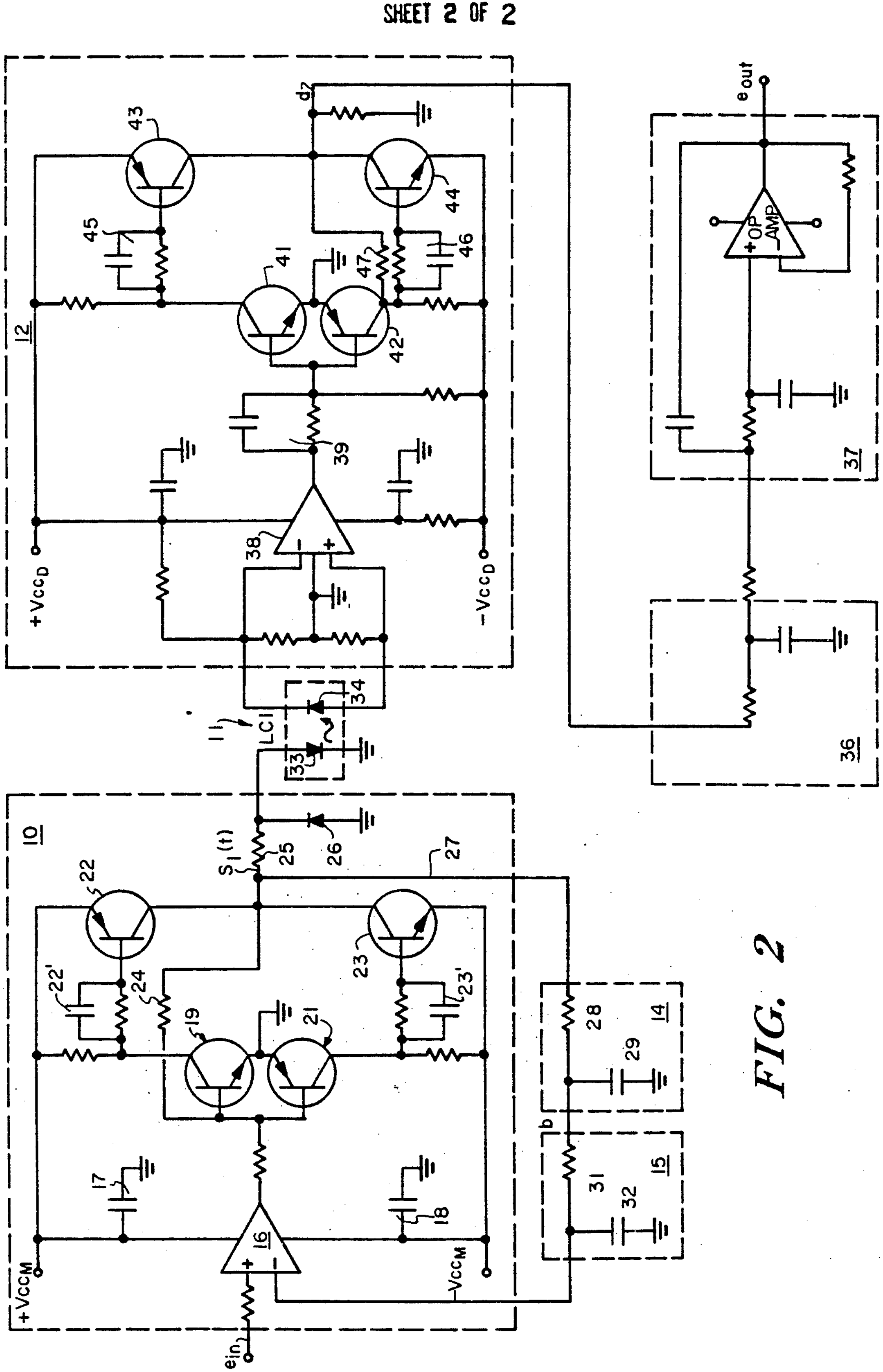
FIG. 2 is a detailed circuit diagram of FIG. 1.

With reference to the drawings there is shown in FIGS. 1 and 2 a light coupled isolator system for data transfer including a modulator 10, an optical isolator 11 and a demodulator 12. At the modulator is a comparator 13, an integrator 14 and a low pass filter 15. Applied to one input of the comparator unit is a signal $e_{in}(t)$ representing, for example, an electrical signal output indicative of a patient derived physiological parameter by way of a bedside monitor. This analog signal would be of the pre-processed type having a signal strength in the volt region with signal information in a low frequency range, anywhere, for example, from 0 to 100 Hz.

Comparator 13 includes an operational amplifier 16 at which one input, $e_{in}$ is applied. The operational amplifier is of the high gain type and is connected from a first power supply source and by-pass filters 17, 18. The output of the op-amp is fed to a push-pull switching stage at the bases of transistors 19 and 21, the stage having an exceedingly fast rise and fall time to accommodate a 3 KHz reference signal frequency. The emitters of transistors 19 and 21 are grounded and their collectors are respectively connected to the bases of transistors 22 and 23 via mutual circuits 22' and 23' each including a resistor and capacitor in parallel. The RC coupling serves to speed up the switching action by turning on harder the relevant transistors 22 or 23. The collector outputs of transistors 22 and 23 are also coupled back to the bases of transistors 19 and 21 by way of resistor 24 to turn on harder the relevant transistor 19 or 21 and the other off harder. Through such an arrangement an exceedingly fast switching operation is achieved to provide for a more definitive zero crossing. The net effect of a push-pull switching stage is to provide a very fast square wave output denoted as $S_1(t)$, as illustrated at FIG. 3b, across an output load represented by resistor 25 and diode 26.

The switching circuit output is tapped and fed back via lead 27 to operational amplifier 16 first by way of an integrator 14 comprising of resistor 28 and capacitance 29 to provide a signal which may be represented as $K_1 \int S_1(t)$ which signal is filtered through low pass filter 15 including a resistor 31 and capacitor 32, having, for example, an upper range anywhere from about 100 to 1000 Hz. The low pass filter 15 smooths the integrated output in sine wave fashion, which signal might be denoted as $K_2 \int S_1(t) + \phi(t)$ or $e_1(t)$ as depicted at FIG. 3d where $K_2$ is a constant and $\phi$ represents same phase shift between the $e_1(t)$ and the integrated wave.

The modulator unit 10 as a whole acts as a saturating phase shift type oscillator and internally generates a reference signal $e_1(t)$ which in the present embodiment is a 3 KHz sinusoidal wave form when $e_{in}(t)$ is zero, having a peak to peak voltage of a few millivolts so as to just exceed the threshold of the operational amplifier unit as is shown in FIG. 3e. The optical isolator 11 which acts to couple modulator 10 with demodulator 12 includes a light emitting diode 33 and photo diode 34 adapted to instantaneously respond to the comparator 13 output $S_1(t)$ between one on and off state.

The diode 34 is coupled to the demodulator 12 comprising a limiter 35, integrator 36 and low pass filter 37. Limiter 35, as shown in FIG. 2, is of similar configuration as the comparator 13. The positive and negative inputs to an op-amp 38 are connected from each side of diode 34, and the op-amp output is coupled via an RC parallel network for providing an input signal of proper level to the bases of transistors 41, 42. These latter transistors together with transistors 43, 44, RC coupling circuits 45, 46 and feedback resistor 47 define a fast push-pull switching stage similar to that discussed above with relation to comparator 13.

The collectors of transistors 43,44, having an output signal denoted as $S_2(t)$ which is identical to $S_1(t)$, are connected to an integrator unit 36 having similar RC values as integrator 14. A low pass active filter 37 connected from integrator 36 provides a minimum of attenuation in the low pass band and removes the higher frequency carrier signal. The output signal from filter 37 denoted as $e_{out}$. The limiter 35 is provided with a second power supply separate from the first so that maximum isolation is provided for between the modulator and demodulator stages.

Figure 3:
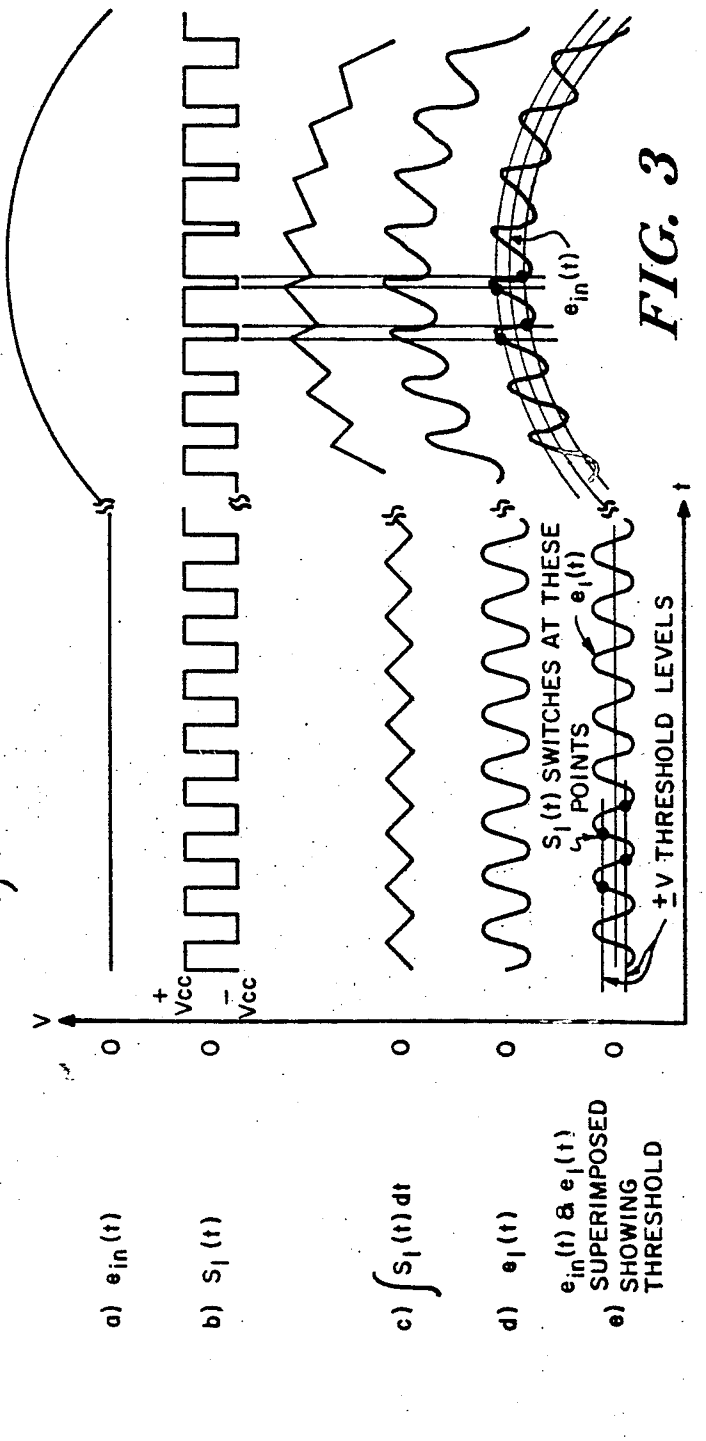
FIG. 3 is a time varying representation of waveforms corresponding to certain locations in FIGS. 1 and 2.

In operation, as may be seen with reference to FIGS. 2 and 3 when $e_{in}$ equals 0 during the period up to the break SS set out at FIG. 3a, the switching stage of comparator 13 will generate a square wave at a 3 KHz rate as shown in FIG. 3b. As the reference signal exceeds the bi-polarity threshold level, depicted at FIG. 3e, op-amp 16 goes low to turn on transistor 21 which in turn, turns on transistor 23 to provide a negative level −Vcc for $S_1(t)$. Alternatively, when the negative threshold level is exceeded by the 3 KHz reference signal, the op-amp is driven high to turn on transistor 19 which, in turn, turns on transistor 21 to provide a positive level +Vcc for $S_1(t)$. The square wave signal $S_1(t)$ generated, due to the fast response, provides for a signal $S_1(t)$ of uniform pulse width, absent any signal $e_{in}(t)$, having uniform zero crossing characteristics. Integrator 14 and filter 15 act on the signal $S_1(t)$ to provide a feedback signal $e_1(t)$, as represented at FIG. 3*d*, of waveform having an average voltage level at 0 so that the feedback signal supplied from filter 15 to the op-amp leaves the peak to peak threshold unaltered about zero.

An an $e_{in}$ pre-processed signal is introduced indicative of some physiological parameter of a patient, illustrated as the signal after the break SS in FIG. 3*a*, the two inputs to the op-amp $e_{in}$ and feedback $e_1(t)$ vary. This variance causes the period of time for saturation of the op-amp to go negative or positive to also vary, depending upon when the positive or negative threshold has been exceeded. The op-amp remains in one polarity stage until the feedback $e_1(t)$ via integrator 14 and low pass filter 15, is built up to equal $e_{in}$ and then slightly exceed $e_{in}$ in the opposite direction by a magnitude of greater than the threshold ± V to drive the op-amp output in the opposite direction.

For example, assuming $S_1(t)$ to be low when $e_{in}(t)$ appears which starts going up, $e_{in}(t)$ will become greater than the feedback signal $e_1(t)$ to cause the op-amp output $S_1(t)$ to go high causing the integrator voltage on capacitor 29 to increase and the low pass filter to go high in the positive direction until $e_1(t)$ exceeds $e_{in}$ by slightly greater than the threshold level to again force $S_1(t)$ low. As may be observed with reference to FIG. 3, as the magnitude of the signal $e_{in}(t)$ increases it takes an increasingly longer period of time for the op-amp to go low yet an increasingly shorter period of time to go high. In effect, the feedback signal modulates the 3KHz zero crossing in the op-amp by providing a variable pulse width output.

Because of the manner of sharply driving the light coupling isolator unit 11 on and off as opposed to different levels of intensity, the zero crossing technique approach provides for reliable data transmission to approximately approach one percent of the original signal input. This accuracy is provided irrespective of wide temperature ranges and/or differences in the operating characteristics of the two diodes within the light coupling unit. Due to the on-off aspect, the output diode 34 of the light coupling isolator unit 11, can be remotely located with the limiter input of the demodulator unit 12.

In the dual diode 33, 34 configuration of light coupling isolator 11, a pulsed signal equivalent to $S_1(t)$ is generated for application to op-amp 38 of limiter 35. When diode 34 is off the inverting side of the op-amp is biased high from the power supply causing its output to go low. As diode 34 goes on the non-inverting side of the op-amp is biased high causing its output to go high. Thus as the diode coupling is turned off and on op-amp 38 goes likewise by going low and high. The push-pull switching arrangement following the op-amp operates similar to that in comparator 13 to provide an output signal $S_2(t)$ which is identical to $S_1(t)$, which is integrated and filtered to generate a signal $e_{out}(t)$ which is essentially the same as the input signal $e_{in}(t)$.

We claim:

1. A system for transmitting signals substantially representative of a given data bearing input waveform comprising:

light coupling means for providing isolation between an input signal and an output signal;

modulating means including comparator means having threshold settings, for generating a constant amplitude switching waveform of a higher frequency than the input waveform, having zero crossings determined by the threshold settings, which are modulated by the input waveform to provide a pulse width modulated signal to switch the light coupling means between an on and off state; and said modulating means including feedback means for supplying to said comparator means a signal which is a function of the modulated switching waveform;

demodulating means responsive to said light coupling means, for demodulating the zero crossing information derived, to essentially recover the original data bearing waveform.

2. A system according to claim 1 whereby said modulating means operates as a saturating phase shift type oscillator.

3. A system according to claim 2 wherein said modulating means comprises:

push-pull switching output stage means connected from said comparator means; and said feedback means includes integrator means and low pass filter means connected from the switching output stage means back to an input of said comparator means.

4. A system according to claim 3 whereby said demodulating means comprises:

limiter means second push-pull switching output stage means connected from said limiter means;

integrator means connected from said second push-pull stage means; and filter means connected from said integrator means.

* * * * *

UNITED STATES PATENT OFFICE

CERTIFICATE OF CORRECTION

PATENT NO. : 3,794,841

DATED : February 26, 1974

INVENTOR(S) : Louis Ciro Cosentino and Peter Richard Bove

It is certified that error appears in the above-identified patent and that said Letters Patent are hereby corrected as shown below:

Cover (information) page of issued patent, insert the following:

[73] Assignee: -- HOFFMANN-LA ROCHE INC., Nutley, New Jersey --

Signed and Sealed this

Thirty-first Day of August 1976

[SEAL]

Attest:

RUTH C. MASON
*Attesting Officer*

C. MARSHALL DANN
*Commissioner of Patents and Trademarks*